July 11, 1950 D. C. CHASE 2,514,841
METHOD OF AND MEANS FOR TREATING RUBBER
Filed Jan. 17, 1947 5 Sheets-Sheet 1
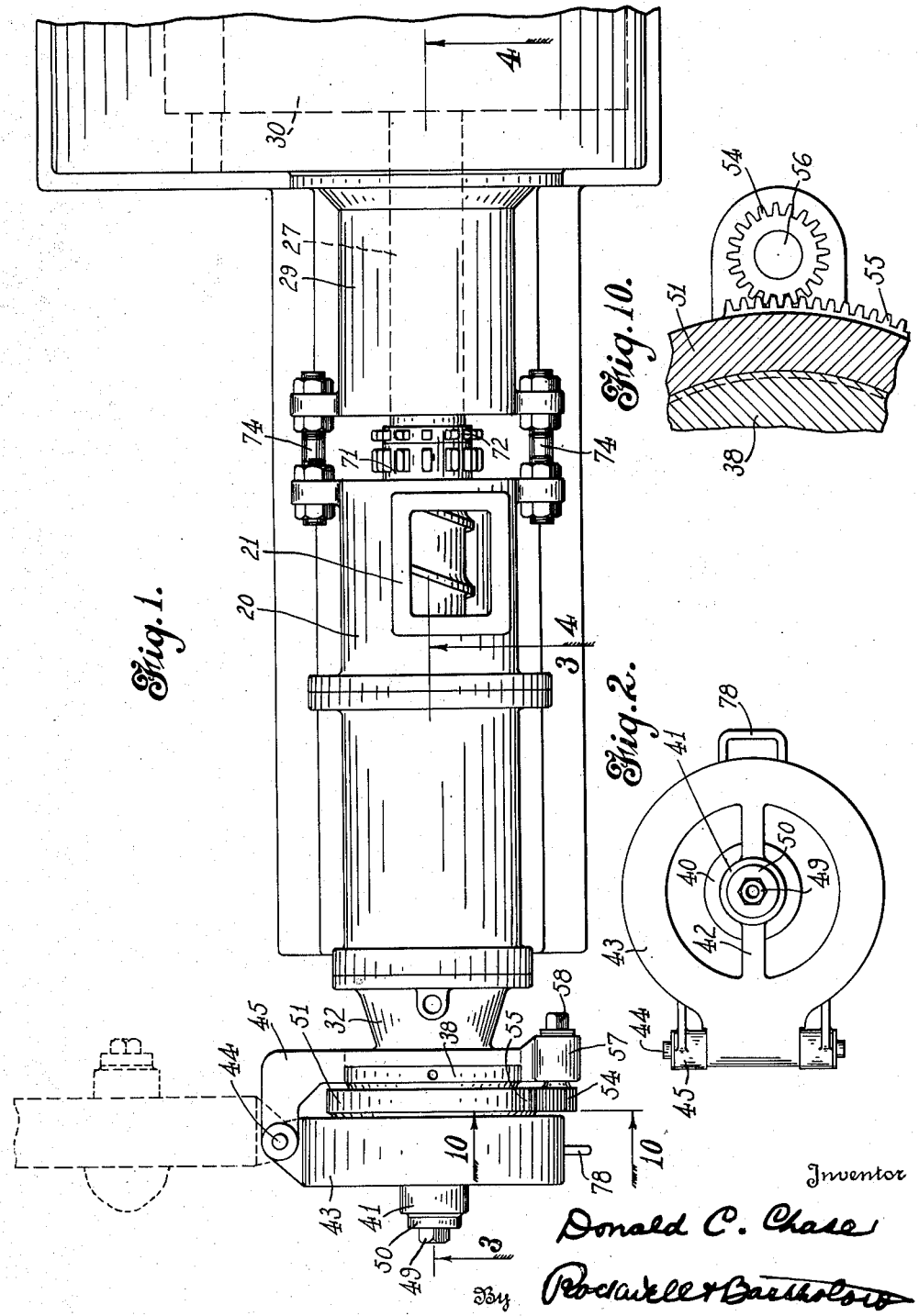
Inventor
Donald C. Chase
By Rockwell + Bartholow
Attorneys July 11, 1950 D. C. CHASE 2,514,841
METHOD OF AND MEANS FOR TREATING RUBBER
Filed Jan. 17, 1947 5 Sheets-Sheet 2
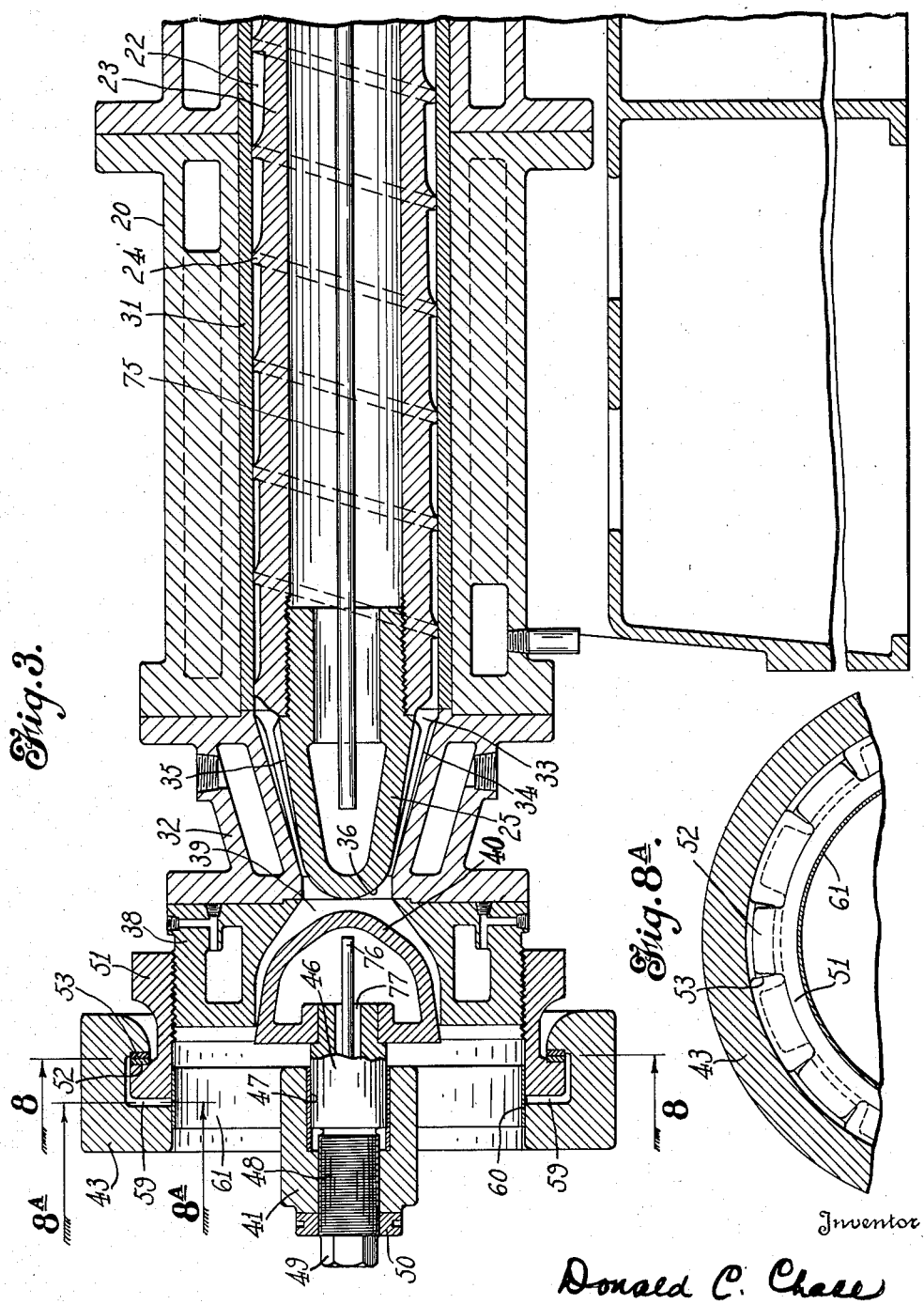
Inventor
Donald C. Chase
By Rockwell & Bartholow
Attorneys

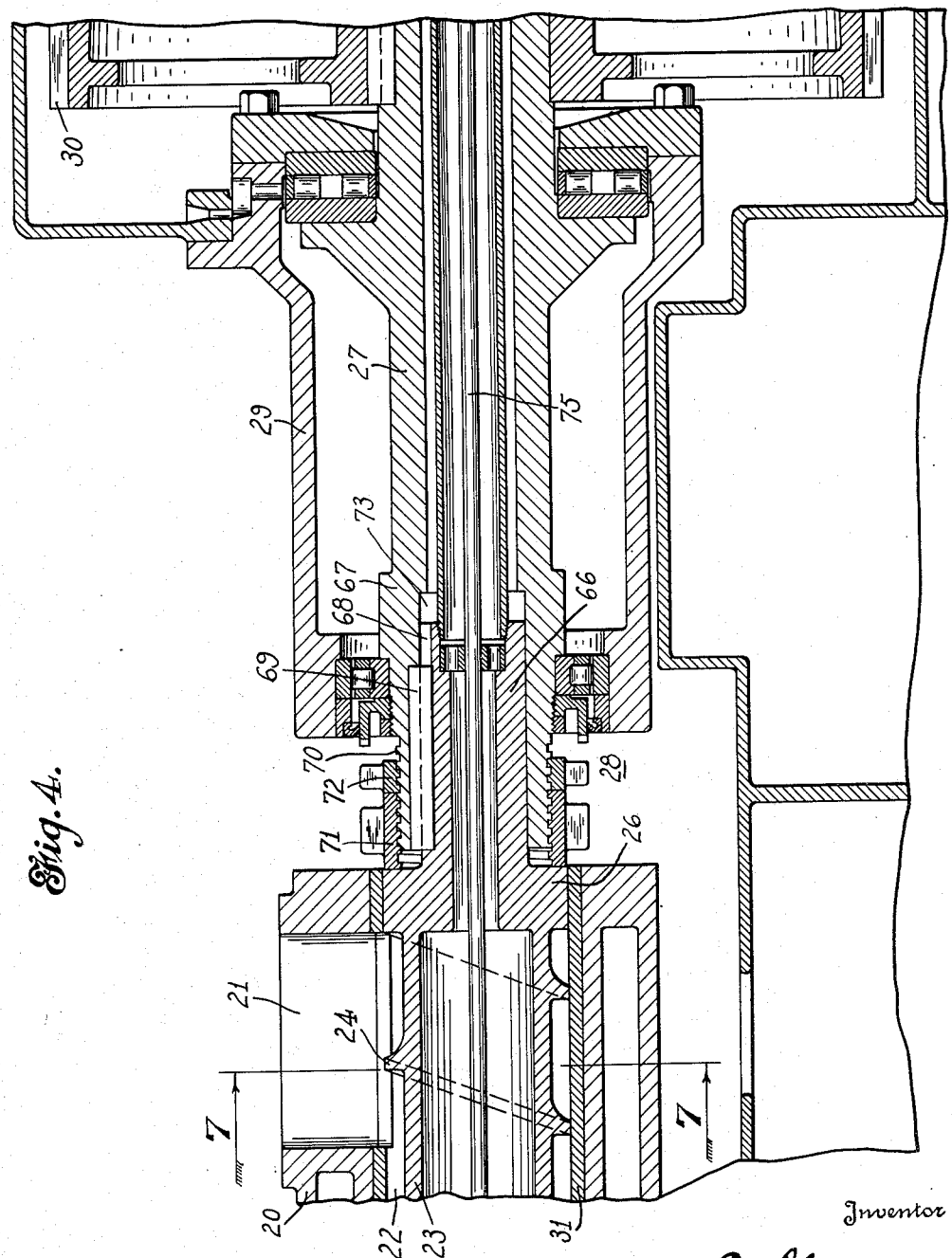

July 11, 1950 D. C. CHASE 2,514,841
METHOD OF AND MEANS FOR TREATING RUBBER
Filed Jan. 17, 1947 5 Sheets-Sheet 4
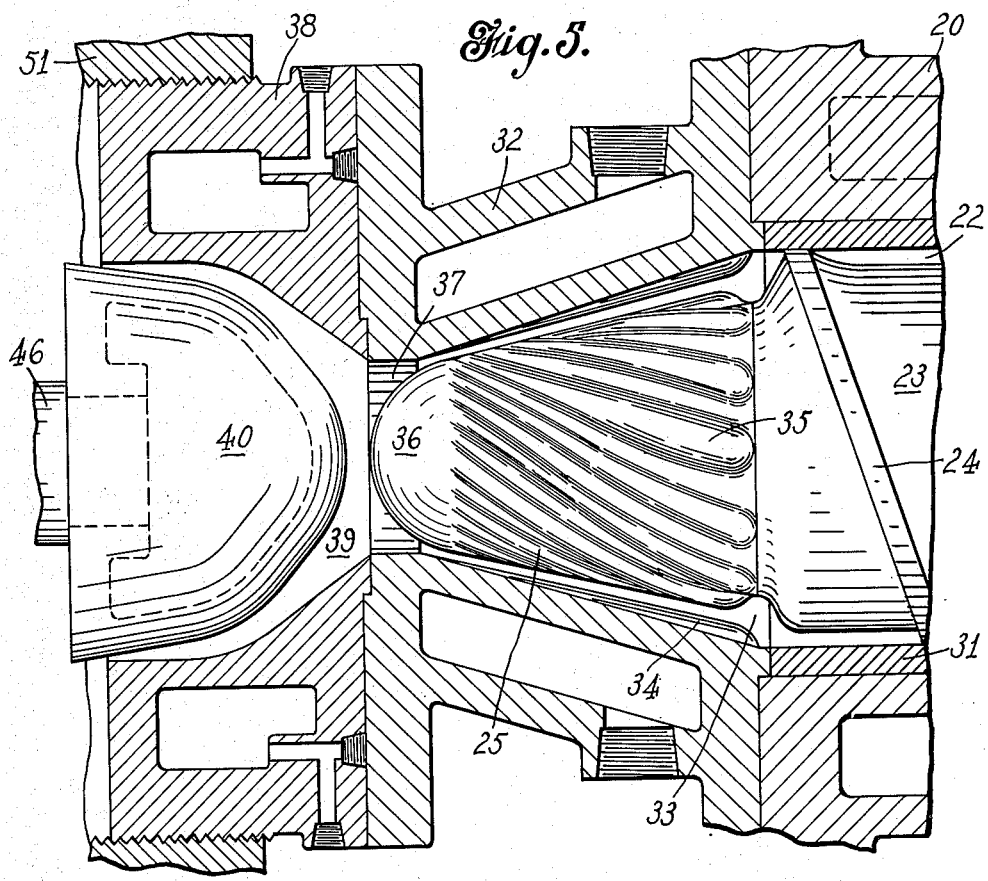
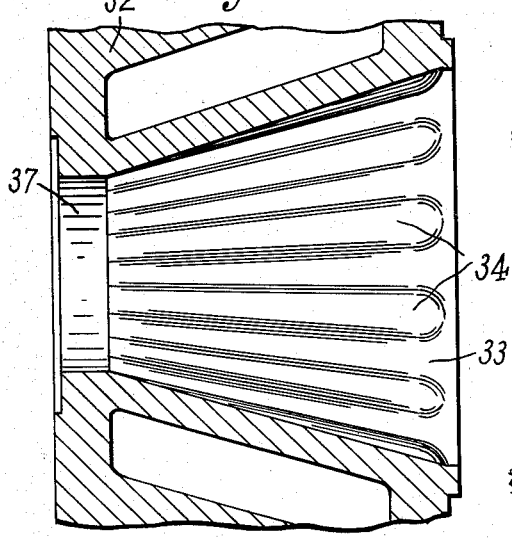
Inventor
Donald C. Chase
By Rockwell & Bartholow
Attorneys July 11, 1950          D. C. CHASE          2,514,841
METHOD OF AND MEANS FOR TREATING RUBBER
Filed Jan. 17, 1947          5 Sheets-Sheet 5
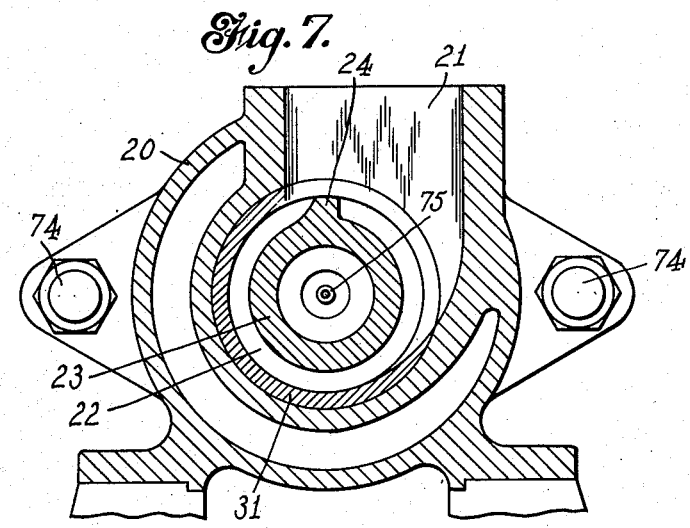
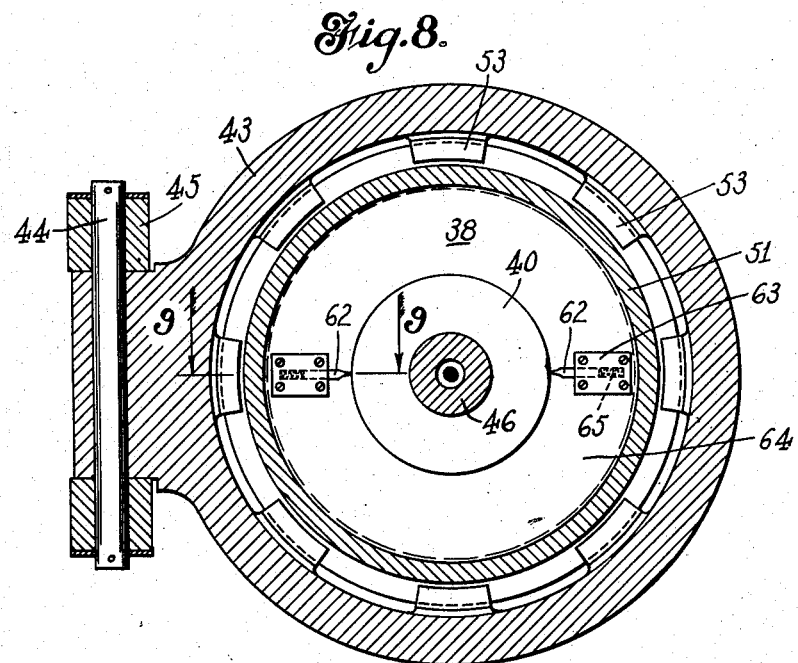
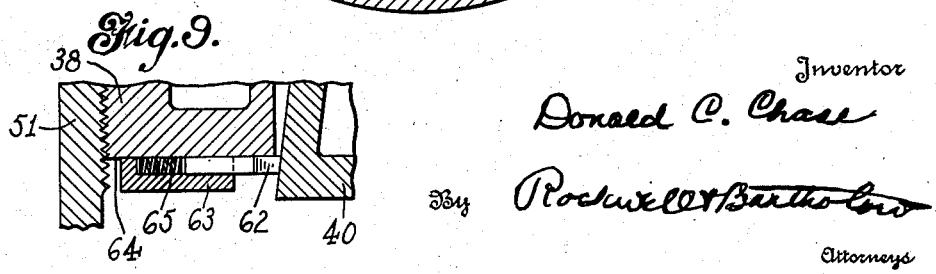
Inventor
Donald C. Chase
By Rockwell & Bartholow
Attorneys Patented July 11, 1950

2,514,841

UNITED STATES PATENT OFFICE 2,514,841

METHOD OF AND MEANS FOR TREATING RUBBER

Donald C. Chase, Milford, Conn., assignor to Farrel-Birmingham Company, Incorporated, Ansonia, Conn., a corporation of Connecticut Application January 17, 1947, Serial No. 722,548

14 Claims. (Cl. 18—14)

In the manufacture of various rubber products, uncured rubber stock containing vulcanizing ingredients is commonly handled in the form of pellets or bullet-like pieces, as this method of handling has definite advantages. However, in softening the pellets preliminary to introducing the uncured stock into the tubing machine, calender or other machine, there have been certain drawbacks and disadvantages. An open mill is commonly used for softening, but such a machine cannot be used successfully in warming up rubber in the pellet form. On the other hand, an internal mixer equipped with mixing blades is a batch type of machine, and, moreover, delivers the material in a form not easily handled.

An object of the present invention is to provide a new method of and apparatus for warming up uncured rubber in the form of pellets or other small pieces containing vulcanizing ingredients in a continuous manner.

Another object is to provide against the clogging of the warm-up machine by material containing vulcanizing ingredients.

A further object is to provide a machine of a structure such that the material going through the machine will be maintained under effective control as regards temperature, and will not reach a temperature above a definite limit, for example, 245° F.

In the accompanying drawings:

Fig. 1 is a top plan view of a machine suitable for the carrying out of the new method;

Fig. 2 is an end view of the machine looking from the left-hand end of Fig. 1;

Figs. 3 and 4 together show the machine in vertical longitudinal section on a larger scale, certain parts being broken away, on lines 3—3 and 4—4 of Fig. 1;

Fig. 5 is an enlarged fragmentary vertical section of the discharge portion of the machine;

Fig. 6 is a sectional view showing flutes provided on the casing of the machine;

Fig. 7 is a section on line 7—7 of Fig. 4;

Fig. 8 is a section on line 8—8 of Fig. 3;

Fig. 8A is a section on line 8A—8A of Fig. 3;

Fig. 9 is a section on line 9—9 of Fig. 8;

Fig. 10 is a section on line 10—10 of Fig. 1; and

Fig. 11 is a fragmentary perspective view of a sheet of rubber discharged from the machine.

In its general features the machine illustrated comprises a casing providing a generally cylindrical chamber, said chamber having at one end a hopper into which the pellets are introduced, and the chamber being provided interiorly with a rotor of generally cylindrical shape provided exteriorly with a feed member in the form of a shallow screw rib or blade that advances the material through the chamber from the hopper to the discharge end of the casing. Adjacent the discharge end of the casing the rotor carries a conical working member in the form of a fluted head over which the material is forced by the feed screw and which is provided with external flutes that work the rubber against kneading flutes on the casing portion surrounding said head, the head also being instrumental in forcing the material in the discharging direction. The conical head acts to force the material into a supplementary chamber in which is located an interior member in the nature of a plug or valve, which plug or valve, in connection with its associated casing portion, provides a narrow annular space through which the material is extruded by the action of the rotor, the plug or valve being adjustable in an axial direction so that the area of the extrusion opening can be adjusted to meet different conditions. The discharge portion of the machine is also provided with cutting means, as hereinafter described, acting upon the issuing tube of material to split the tube and convert it into sheets, which sheets can be readily picked up and transported to the machine into which the warmed-up rubber is to be introduced.

In addition to the axial adjustment of the plug or valve, there is provision in the machine for lengthwise adjustment of the rotor in the treating chamber containing the feed screw and the fluted kneading head, principally for the purpose of adjusting the area of the discharge provided between the fluted head and the chamber wall. For this purpose the rotor itself is adjustable with respect to a driving member to which the rotor is coupled, and which, in turn, is driven from the drive gearing of the machine.

In the drawings, the casing of the machine is indicated at 20, the feed hopper at the receiving end of the casing at 21, and the generally cylindrical feed chamber at 22. The rotor body located within the feed chamber is indicated at 23, the shallow screw rib at 24, and the fluted kneading head at 25. The rotor 23 has a head 26 rotating in an opening in the right-hand end (Fig. 4) of the casing 20, and the rotor is extended somewhat to the right of the casing (Fig. 4) and coupled to a drive shaft 27 by coupling means, generally indicated at 28. The driving shaft 27 is journaled in a casing section 29, and is driven by means including a gear 30 keyed to the shaft.

The casing 20 is preferably made in sections and is provided with a lining member 31 of hard material in the form of a hollow cylinder having a smooth inner surface that is substantially in contact with the screw rib 24. The screw rib is a single rib extending substantially throughout the length of the chamber, and preferably having a substantially cylindrical outer face rotating close to the liner. In the spaces between the turns of the screw rib the rotor body is opposed to the liner, and in these spaces the rotor body is closer to the liner toward the discharge end of the chamber, as appears from Fig. 3.

The fluted head 25 is located within a section 32 of casing 20, which section presents a conical chamber 33, the wall of which is provided with kneading flutes 34 that diverge from each other toward the larger end of chamber 33, as shown in Fig. 6. These kneading flutes cooperate with flutes 35 on the head 25. Both the flutes 34 and the flutes 35 have rounded bodies which increase somewhat in width toward the larger end of the conical chamber. Toward its smaller end the head 25 is unfluted, and is shaped to present a rounded boss or dome 36 that is in part located within a cylindrical opening 37 provided in the casing at the discharge end of the section 32. The feeding screw rib may, as shown, have its turns arranged at an angle of approximately 15° to the vertical, for the purpose of feeding the material through the chamber at a comparatively rapid rate, and the flutes 35 on the conical head may be arranged at an angle of approximately 30° to the rotor axis, so that, as the flutes knead and work the material against the cooperating casing flutes, the material will be advanced through the conical chamber and through the discharge mouth 37 of said chamber.

The casing of the machine also includes a portion 38 suitably fastened to the section 32 and providing a chamber 39 receiving the material from the mouth 37. Within the chamber 39 is the plug or valve 40, both the chamber 39 and the plug or valve 40 being generally of conical shape, with the larger end of the cone being disposed in the direction of the discharge, and the arrangement being such that material passing over the rounded end of the fluted head 35 passes into chamber 39 with a certain amount of clearance and freedom of movement, the clearance being progressively decreased toward the discharge, however, and the material issuing from the larger end of chamber 39 around the plug 40 in the form of a thin tube, the action being an extrusion action through a narrow annular space between the plug and the associated casing portion.

In detail the chamber 39 preferably has the longitudinal cross-sectional shape shown in Fig. 5, the larger end being substantially cylindrical and the receiving end being on an incline, and there being a fillet joining the inclined surface with the cylindrical surface. Opposite the discharge portion of chamber 39 the plug 40 has an inclined cone surface, and this is joined on a fillet to a conical portion at a greater inclination to the axis of the plug, and at the receiving end of the generally conical plug is a rounded portion opposing the head 25 with an appreciable intervening space.

The plug 40 is held rigidly in place during the operation of the machine, but is longitudinally adjustable by suitable means. In the form shown the plug is mounted in a boss 41 on the crossbar 42 of a spider 43 that is pivoted by a pintle 44 to a frame 45 suitably fixed on the casing portion 38. By this arrangement the spider and the plug carried thereby can be swung on the axis provided by pintle 44 so as to move the plug out of the chamber 39. The body of the plug 40 is carried by a suitable stem 46 engaging a socket 47 in the spider boss, and provided with a threaded extension 48 engaging internal threads in the boss. The extension 48 is provided with an end in the form of a nut 49, and by turning the nut the plug can be advanced and retracted with reference to its associated casing portion in order to control the thickness and temperature of the issuing tube of material. A lock nut 50 acts to lock the plug in the axial position to which it is adjusted.

The spider 43, pivoted at one side of the machine, is adapted to be held stationary in the operative position by a suitable connection to the casing section 38. In the form shown there is a bayonet joint connection between the spider and a member 51 mounted upon section 38, member 51 being in the form of a sleeve embracing section 38 and having internal threads engaging external threads on the casing section. Sleeve 51 extends axially beyond the discharge end of casing section 38, and is provided with radially projecting lugs 52 which, by rotation of sleeve 51, are adapted to be brought into registry with cooperating lugs 53 on member 43 for the purpose of locking the latter member in position. Sleeve 51 can be rotated in a suitable manner for releasing the spider 43, as, for example, by using a wrench to rotate a pinion 54 in engagement with an arcuate rack 55 provided upon the forward portion of the sleeve 51. The pinion 54 has a shaft 56 mounted in a bearing 57 provided on frame member 45, and the pinion can be rotated by engaging a wrench with a polygonal extension 58 provided upon the shaft 56. When the sleeve has been rotated to a position in which the spider 43 is disengaged, the latter can be swung on its pivot 44 to an inoperative position such as the one indicated by dotted lines in Fig. 1, to thereby carry the plug 40 out of the casing portion 38 so that full access to the interior of casing portion 38 can be obtained.

As shown in Fig. 3, spaces 59 are provided between the lugs 52 and the adjacent portion of the spider when the parts are in the operative position, and, in order to prevent penetration of rubber into these spaces while the machine is being operated, suitable cover means for the spaces are provided. In the form shown, these spaces are covered over by substantially semi-annular cover members 60 and 61 made of metal that are placed in position after the spider has been moved to the operative position. The ends of the cover members will be engaged with the crossbar 42 of the spider. The lugs 52 of sleeve 51 are arranged in groups located at the respective sides of the crossbar 42.

The issuing rubber being discharged between the plug 40 and the adjacent casing portion in the form of a tube, will be severed into two parts before it reaches the crossbar of the spider, and for this purpose suitable cutting knives are employed. In the form shown, these cuttting knives are carried upon the casing member 38 at the discharge end thereof, and the severing knives are of the sliding type and are spring pressed so as to cut the rubber by being forced inwardly against the tube in a radial direction. In the drawings the sliding knives are indicated at 62, and they are mounted in guide members 63 applied to the end face 64 of member 38. Each knife is acted upon by a spring 65, and each knife has a pointed edge that is pressed toward the side surface of plug 40 so as to lie normally in contact with said surface, as shown in Fig. 9, said surface being upon a portion of the plug which is disposed externally of the chamber 39, and said surface being a slightly inclined surface provided upon the plug, as hereinbefore described.

It has been stated previously that an adjustable coupling 28 is provided between the rotor 24 and the shaft 27. As will be seen from Fig. 4, the rotor is provided with an extension 66 that is received within a sleeve-like portion 67 on shaft 27. Extension 66 has a sliding splined connection with shaft portion 67 that is provided by forming in extension 66 a groove 68 engaged by a spline 69 that is fixed in part 67. The shaft extension 67 is provided exteriorly with screw threads 70 that are engaged by an adjusting nut 71 having one of its ends engaged with the rotor head 26, the arrangement being such that, when the nut 71 is rotated in one direction, the rotor will be thrust to the left with reference to Fig. 4 for the purpose of moving its kneading head 25 into closer relation to the surrounding casing portion. After such adjustment of the rotor has been effected, a lock nut 72 is moved up against nut 71 so as to secure it firmly in position. Should it be found, however, that the kneading head is advanced too far toward the discharge end of the machine, the nuts 72 and 71 will be loosened and the action of the material in the machine upon the rotor will be such as to thrust the rotor to the right with reference to Fig. 4. When the rotor has been brought to the exact position which is desired, the adjusting nut can again be locked in place by the lock nut. The sleeve-like portion 67 of shaft 27 is provided with a clearance for the rotor extension, which is indicated in the drawings at 73, and this clearance will be sufficient for any desired lengthwise adjustment of the fluted kneading head 25.

The casing portions 20 and 29 provide between their adjacent ends a space in which the adjusting means for the rotor is located, so as to be readily accessible, but the two casing portions are maintained in fixed relation to each other by means such as tie bolts 74, and the tie bolts provide for lengthwise adjustment between the casing portions.

The rotor and the kneading head are of hollow form, and their temperature can be controlled by a fixed interior tube 75 disposed longitudinally and adapted to conduct a temperature-controlling fluid. The valve or plug 40 is also hollow, and is adapted to have its temperature controlled by an interior fixed longitudinal tube 76 adapted to conduct a suitable fluid which will circulate through the body of the plug, and through an axial passage 77 in its stem. As shown in Fig. 3, the plug has a large space in the interior adapted to receive a cooling fluid, and the surface of the plug over which the rubber passes is provided upon a relatively thin wall, with a view to maintaining the rubber at the required low temperature. The casing portion of the apparatus will also be subject to temperature control through the circulation of a suitable fluid, and in this connection it is noted that in the form shown the casing 20 is jacketed to provide fluid-circulating passages. This is also true of the casing section surrounding the kneading head and the casing section in which the plug 40 is partially disposed.

The hollow jacketed portions of the casing and the tubes 75 and 76 are connected with piping arranged to supply and drain off the temperature-controlling fluid, but this part of the apparatus forms no part of the invention, and hence it is not illustrated.

For convenience in manipulating the plug-equipped spider, the latter may be provided with a suitable handle 78.

The fluted kneading head can be fixed to the rotor so as to be rigid therewith by suitable means, and in the form shown the kneading head has a threaded shank screwing into one end portion of the rotor body, which is threaded for that purpose.

In my improved method of treating uncured rubber containing vulcanizing ingredients in the form of pellets or other small pieces, the pellets are subjected to the action of a feeding or forcing element which warms them to an extent, with a corresponding increase in plasticity, while the body of uncured rubber is being progressed at a relatively rapid rate, the material while being advanced being in the form of a relatively thin mass in which the particles are worked upon each other to a limited extent only, so that, prior to the kneading action which takes place at the next stage, the rubber in no part of the mass has its temperature rise above a limit which is well below the temperature at which the vulcanizing ingredients would be activated. The temperature can be maintained in the range of 220° F. to 240° F., and the upper limit may be 245° F. The next step is the kneading operation carried out by kneading the rubber between fluted surfaces, one of which moves relatively to the other, and in this step the body of rubber is, generally speaking, in a thin hollow mass where it is easily subject to temperature control and can be maintained in all parts below the upper temperature limit. After the kneading, the rubber is liberated to an extent, and the particles given more freedom of movement, and somewhat slowed by being disposed in a chamber progressively increasing in diameter and acting as a soaking chamber in which the rubber particles are equalized in temperature by having the cooler particles absorb heat from the warmer particles, thereby distributing the heat more uniformly through the mass, and warming up particles which, through the forcing or kneading action, had not been sufficiently warmed. Then after this soaking and equalizing of temperature as the mass is moved along relatively slowly, the thickness of the mass is gradually decreased and the mass forced through an extrusion opening to form a thin-walled tube. The tube is then severed, preferably while it is being extruded, so as to form two sheets of plasticized uncured rubber.

The machine illustrated can be used in carrying out the process above described. Bearing in mind that the temperature of the rubber containing the vulcanizing ingredients should not rise above say 245° F., it is to be noted that the liner in the screw chamber has a smooth surface which will not retard the rubber in its movement, and that the screw turns are at a relatively sharp angle to the vertical so that the rubber will be given a relatively rapid movement from the hopper to the end of the screw chamber and to the discharge end of the kneading chamber. The material in the screw chamber is, moreover, in a mass which is relatively thin, so that heat will be dissipated to a sufficient degree. It will be seen that the intention is to plasticize the material in the screw chamber to a certain extent, or, in other words, to begin the plasticizing of the rubber without causing the mass to be worked upon itself to a degree raising the temperature to an undesirable extent, and it will be seen also that all of the factors mentioned above are of importance in obtaining a substantial initial plasticizing unaccompanied by too great an increase of temperature. As of interest in this connection, it may be said that the machine illustrated, having a screw chamber of 12-inch diameter, is provided adjacent the hopper with a rotor surface between the screw rib turns having a spacing of 1¼ inches from the lining of the chamber, and it is understood from what has been said before that this spacing between the turns decreases to the discharge end of the screw. This dimension just given is by way of example only, but it will indicate the intention to maintain a thin mass in the screw chamber. It will also be apparent that the rotative speed of the screw is a factor in achieving the results sought, and in that connection it is noted that in the machine shown the screw has an R. P. M. of approximately 20.

From the screw the material passes to the kneading instrumentalities. Here the kneading effect further plasticizes the rubber, which, generally speaking, is in a thin conical mass, the thickness of this mass being reduced progressively up to the discharge into the mouth 37. From the mouth 37 at the end of the kneading section the rubber passes into the soaking chamber 39, where the action is as above described. The rubber as it passes over the plug 40 is thinned and picks up speed, and as it is extruded through the annular opening between the plug and the casing it is in the form of a tube having, say, a thickness of from ⅛ inch to $\frac{1}{16}$ inch, which dimension, however, is given only by way of example.

As the temperature maintained in the stock is of such great importance, it is obvious that the fluid supply to the fluid-circulating means of the casing, rotor and valve plug must be such as to maintain the required temperatures in those parts. It will also be apparent that the temperature of the mass will be influenced by the position of the plug in the soaking chamber, and for this reason the axial adjustability of the plug is of importance. The thinning out of the mass as the particles move through the gradually thinning space between the plug and the casing is also of importance with respect to the maintenance of the temperature within certain limits. The plug can be moved toward the kneading means to increase the temperature of the rubber in the hollow cone passage, and moved away from said means to lower the temperature, and in this manner the plug can be adjusted to bring the rubber to a temperature which is sufficiently low to prevent vulcanizing but not so low as to sacrifice plasticity. Thus the adjusting means for the plug provides a supplemental means for effecting a nice or precise adjustment of the temperature.

It is to be observed that the screw rib on the rotor in the form shown has an abrupt surface at the feeding side that is approximately normal to the rotor axis, the surface at the opposite side of the rib being sloped more gradually, and the slope on the second-named side merging into an approximately cylindrical surface on the rotor defining the inner boundary of a shallow space between the rib turns. The width of this space, that is, the space from one turn to the next, is markedly greater than the depth of the space.

Another feature which should be noted is that the tube as it issues from the extrusion orifice is of noticeably greater diameter than the tube of material entering what has been called the soaking chamber. This means that the material as it passes from the kneading head to the extrusion orifice is given a larger diameter, and thereby stretched to an extent, and this stretching is of advantage in heating up particles that have passed over the kneading head without being heated up to the required degree.

It will be apparent that in the form shown the extrusion orifice has a diameter approximating that of the screw rib, as best shown in Fig. 3.

It will be apparent that if, after operation of the machine upon a given supply of material, a certain amount of the material remains in the soaking chamber and in the extrusion orifice, this material can be readily cleared out of the machine by swinging the plug out of position in the manner previously described. In the event that any of the material remaining in the discharge end of the machine has become hardened, the plug can be removed from the normal position so as to gain access to this material. Also, the arrangement described permits the removal of material remaining in the discharge end of the machine, so that, if on the next operation a new kind of stock is used, there will be no contamination of such new stock.

By the present invention the difficulties attendant upon the warming up of pellets or other small pieces of uncured rubber containing vulcanizing ingredients are effectively overcome. Before work in a tubing machine, calender or other machine is started, the rubber is effectively plasticized in an operation in which there is no trouble from the activation of vulcanizing ingredients. There is substantial plasticizing in the warming-up machine, and in many cases this is sufficient, although in other cases some further plasticizing may be necessary. The invention also obtains the plasticizing of the material in a manner and by means which obviate the clogging of the machine and the contamination of the rubber undergoing treatment.

The pellets referred to herein may advantageously be in the form disclosed in the Gordon Patent No. 2,370,952 of March 6, 1945, and the pellets may, if desired, be produced by the method disclosed in that patent or by other suitable method. The pellets treated by the present method contain small particles of uncured rubber thoroughly mixed with the usual or any preferred compounding ingredients, including, with a vulcanizing agent and an accelerator, such filling material, coloring material and the like as it may be desired to use. The invention is not limited in all aspects, however, to the treatment of rubber or other vulcanizable material in pellet form.

Only one form of the apparatus is illustrated, and it is to be understood that various changes in the procedure and in the apparatus may be made without departing from the principles of the invention or the scope of the claims.

What I claim is:

1. The method of plasticizing compounded uncured rubber containing vulcanizing ingredients, which comprises forcing the material in a thin mass from a hopper through a working chamber in working contact primarily with the chamber wall and with limited working of the particles on each other and in a thin mass between kneading surfaces one of which moves relatively to the other so as to maintain the rubber at the required low temperature to inhibit a vulcanizing action, then as the material leaves the kneading surfaces permitting lateral movement of the particles and soaking in a suitable space for uniform heat absorption as the rubber moves along in a generally tubular mass which increases in diameter, then forcing the material through a gradually narrowing space to form and discharge a considerably thinner tube, and subjecting the rubber as it moves from said soaking space to the discharge to the action of a temperature-controlling fluid to keep the temperature below the vulcanizing point.

2. The method of plasticizing compounded uncured rubber containing vulcanizing ingredients while maintaining the rubber being plasticized at the required low temperature to prevent a vulcanizing action, which comprises forcing the material in a thin mass through a working chamber in contact with the chamber wall and in a thin mass between kneading surfaces one of which moves relatively to the other, then as the material leaves the kneading surfaces permitting somewhat freer relative movement of the particles and soaking in a suitable space for uniform heat absorption, then forcing the material through a gradually narrowing space that progressively increases in diameter to subject the rubber to a stretching action and form it into a thin tube, maintaining the rubber during these steps at a relatively low and non-vulcanizing temperature, and severing the tube to convert the stock into sheets.

3. The method of treating compounded rubber containing vulcanizing ingredients, which comprises converting it into the form of small pellets, partially plasticizing the pellets by forcing them at a comparatively rapid rate along the smooth inner surface of a working chamber by means of a shallow screw rib in close proximity to said surface, the material between the screw rib turns being in a relatively thin mass so that the temperature of the material acted on by the rib does not exceed 245° F., and using the action of the screw rib to force the material over relatively moving kneading surfaces and to a soaking chamber and thence to a narrow annular extrusion orifice forming a thin tube while maintaining the temperature of the material below 245° F.

4. The method of treating compounded uncured rubber containing vulcanizing ingredients, which comprises partially plasticizing the rubber by forcing it at a rapid rate along the smooth inner surface of a working chamber by means of a shallow screw rib in close proximity to said surface which decreases in depth toward the discharge end of the screw and using the action of the screw rib to force the rubber over relatively moving kneading surfaces from which it issues generally in the form of a tube, the rubber mass discharged by the screw rib having a thickness substantially less than 1¼ inches, permitting the material to move laterally and outwardly in a soaking chamber in which the hotter particles absorb heat from the cooler particles, forcing the rubber from the soaking chamber through a passage generally in the shape of a cone which increases in diameter, and at the point of maximum diameter forcing the rubber through a narrow extrusion orifice as a thin tube, and subjecting the rubber during all of the aforesaid steps to the action of a temperature-controlling fluid in order to prevent the rise of the temperature to the vulcanizing point.

5. Apparatus for treating rubber, comprising a casing and a rotor having provisions for working and kneading the rubber by moving it at a rapid rate and in a thin mass through working and kneading instrumentalities respectively, the rotor having a shallow screw rib working the rubber against a smooth casing wall with a minimum working action of the rubber particles upon each other, the rib turns being widely spaced from each other and decreasing in depth toward the discharge end of the working instrumentality, said rotor being adapted to force the rubber after working and then kneading out of a narrow extrusion orifice spaced from the kneading instrumentality in the discharging direction, and inner and outer members cooperating with each other to provide said extrusion orifice, said members in the region between the extrusion orifice and the kneading instrumentality presenting a soaking space in which the heat from the hotter particles is taken up by the cooler particles, said soaking space and the extrusion orifice communicating with each other by a rubber-stretching passage generally in the form of a cone having its diameter increasing in the discharge direction, said passage having smooth sloping surfaces facilitating working and discharge and being progressively narrowed to the discharge and the discharge being at the larger end of the cone, said inner member being axially adjustable to vary the temperature of the rubber.

6. Apparatus for treating rubber, comprising a casing and a rotor having provisions for working and kneading the rubber by moving it at a rapid rate and in a thin mass through working and kneading instrumentalities respectively, the rotor having a shallow screw rib working the rubber against a smooth casing wall with a minimum working action of the rubber particles upon each other, the rib turns being widely spaced from each other and decreasing in depth toward the discharge end of the working instrumentality, said rotor being adapted to force the rubber after working and then kneading out of a narrow extrusion orifice spaced from the kneading instrumentality in the discharging direction, and inner and outer members cooperating with each other to provide said extrusion orifice, said members in the region between the extrusion orifice and the kneading instrumentality presenting a soaking space in which the heat from the hotter particles is taken up by the cooler particles, said soaking space and the extrusion orifice communicating with each other by a rubber-stretching passage generally in the form of a cone having its diameter increasing in the discharge direction, said passage having smooth sloping surfaces facilitating working and discharge and being progressively narrowed to the discharge and the discharge being at the larger end of the cone, said inner member being axially adjustable to vary the temperature of the rubber, said inner member having a relatively large interior space receiving temperature-controlling fluid, and having a relatively thin wall subject to temperature control over which the rubber passes in moving from said soaking space to the discharge.

7. In a machine for treating rubber, the combination of a generally cylindrical casing having a smooth interior and adjacent the discharging end interior kneading flutes, a rotor having a screw with a shallow narrow rib and wide spaces between the turns cooperating with the smooth interior surface of the casing, said rib decreasing in depth toward the discharge end from a depth at the receiving end bearing a ratio of about 1¼:12 where 12 is the internal diameter of the casing, said rotor also having a fluted kneading end cooperating with the flutes on the casing, and inner and outer members located toward the discharge with relation to the kneading flutes and providing a soaking chamber and a narrow annular extrusion orifice, said soaking chamber and said orifice being provided by a passage generally in the form of a cone having its larger end in the direction of the discharge, said soaking chamber permitting lateral and outward movement of the rubber and absorption of heat by the cooler particles from the hotter particles, said casing and rotor and said inner and outer members being subject to the action of temperature-controlling fluid which prevents the temperature of the rubber passing through the machine from rising to the vulcanizing point.

8. In a machine for treating rubber, the combination of a generally cylindrical casing having a smooth interior and adjacent the discharging end interior kneading flutes, a rotor having a screw with a shallow narrow rib and wide spaces between the turns cooperating with the smooth interior surface of the casing, said rib decreasing in depth toward the discharge end from a depth at the receiving end bearing a ratio of about 1¼:12 where 12 is the internal diameter of the casing, said rotor also having a fluted kneading end cooperating with the flutes on the casing, and inner and outer members located toward the discharge with relation to the kneading flutes and providing a soaking chamber and a narrow annular extrusion orifice, said soaking chamber and said orifice being provided by a passage generally in the form of a cone having its larger end in the direction of the discharge, said soaking chamber permitting lateral and outward movement of the rubber and absorption of heat by the cooler particles from the hotter particles, said casing and rotor and said inner and outer members being subject to the action of temperature-controlling fluid which prevents the temperature of the rubber passing through the machine from rising to the vulcanizing point, said inner member being constituted by a hollow plug having a thin wall which defines in part the soaking chamber and the extrusion orifice.

9. In a machine for treating rubber, the combination of a generally cylindrical casing having a smooth interior and adjacent the discharging end interior kneading flutes, a rotor having a screw with a shallow narrow rib and wide spaces between the turns cooperating with the smooth interior surface of the casing, said rib decreasing in depth toward the discharge end from a depth at the receiving end bearing a ratio of about 1¼:12 where 12 is the internal diameter of the casing, said rotor also having a fluted kneading end cooperating with the flutes on the casing, and inner and outer members located toward the discharge with relation to the kneading flutes and providing a soaking chamber and a narrow annular extrusion orifice, said soaking chamber and said orifice being provided by a passage generally in the form of a cone having its larger end in the direction of the discharge, said soaking chamber permitting lateral and outward movement of the rubber and absorption of heat by the cooler particles from the hotter particles, said casing and rotor and said inner and outer members being subject to the action of temperature-controlling fluid which prevents the temperature of the rubber passing through the machine from rising to the vulcanizing point, said inner member being constituted by a hollow plug having a thin wall which defines in part the soaking chamber and the extrusion orifice, the thin wall of the plug having a steeply inclined part presented toward the soaking chamber and a less steeply inclined part in following relation to the first-mentioned part.

10. In a machine for treating rubber, the combination of a casing having an inner cylindrical surface, a rotor having a shallow screw rib to work material against said surface with a limited amount of working of the particles on each other, said casing having a discharge portion with interior kneading flutes and the rotor end having a conical head provided with flutes cooperating with said kneading flutes, and means providing a soaking space gradually decreasing in width to a thin annular extrusion orifice in communication with said soaking space, said soaking chamber receiving the rubber from said conical head, said last-named means including inner and outer members, the inner member being formed generally as a cone having its larger end located adjacent the extrusion orifice and having a steeper inclined part adjacent the receiving end merging into a less steep part adjacent said orifice, said extrusion orifice having a diameter approximating that of said screw rib, and means for adjusting said inner member in an axial direction.

11. In a machine such as described, the combination of a casing having a smooth inner cylindrical surface, a rotor having a shallow screw rib to work material against said surface, said casing having a discharge portion with interior kneading flutes and the rotor end having a conical head provided with flutes cooperating with said kneading flutes, inner and outer members providing a generally conical passage creating a soaking space which is relatively wide and decreases gradually in width to an extrusion orifice which is relatively narrow, said inner member being formed generally as a cone having a large interior space accommodating cooling fluid and having its larger end located adjacent the extrusion orifice and its smaller end rounded and facing toward said conical fluted head, and means for adjusting said inner member in an axial direction.

12. In rubber-treating apparatus, a rotor and a casing portion having provisions by which the material is worked and then kneaded and then discharged from the casing portion, members forming an extension of said casing portion and arranged one within the other and providing a generally cone-shaped passage receiving the material and leading to an extrusion orifice at the larger end of the cone through which the material is ejected in the form of a thin tube, said last-named members comprising an inner plug and an outer casing portion, a spider carrying the plug and having a circular rim provided interiorly with a groove, a sleeve threaded on the exterior of a plug-enclosing part of said last-named casing portion to rotate thereon and having an axially extended part provided with lugs adapted to be received in the groove of said rim and to interlock with lugs carried by the rim, and a mounting at one side of said last-named casing portion on which the spider can swing laterally.

13. The method of treating compounded uncured rubber containing vulcanizing ingredients, which comprises converting the material into the form of small pellets, partially plasticizing the pellets by forcing them at a comparatively rapid rate and in a thin mass through a working chamber in contact with the chamber wall and forcing the material in a thin mass between kneading surfaces one of which moves relatively to the other, then as the material leaves the kneading surfaces permitting somewhat freer movement of the particles and soaking in a suitable space for uniform heat absorption, then forcing the material through a gradually narrowing space that progressively increases in diameter to subject the rubber to a stretching action and form it into a thin tube and ejecting it from said space substantially in the region where the maximum diameter is reached, and maintaining the rubber during the partial plasticizing step and the aforesaid following steps at a temperature not exceeding 245° F.

14. The method of plasticizing compounded uncured rubber containing vulcanizing ingredients, which comprises forcing the material rapidly and in a thin mass along the surface of a working chamber in contact with said surface and in a thin mass between kneading surfaces one of which moves relatively to the other, then as the material leaves the kneading surfaces permitting freer and slower movement of the particles and soaking of the rubber in a suitable space until the heat of the hotter particles has been absorbed by the cooler particles, and then forcing the material through a gradually narrowing and elongated space that progressively increases in diameter so as to stretch the material while it is being formed into a tube, and maintaining the rubber while it is being treated at a temperature not exceeding 245° F. so as to prevent the vulcanizing of the rubber.

DONALD C. CHASE.

REFERENCES CITED

The following references are of record in the file of this patent:

UNITED STATES PATENTS

| Number | Name | Date |
| --- | --- | --- |
| 1,435,659 | Roberts | Nov. 14, 1922 |
| 1,876,064 | Long | Sept. 12, 1932 |
| 1,935,050 | Gordon | Nov. 14, 1933 |
| 1,947,202 | Homeier | Feb. 13, 1934 |
| 2,151,476 | Kimble et al. | Mar. 21, 1939 |
| 2,177,633 | Blackard | Oct. 31, 1939 |
| 2,177,660 | Kimble et al. | Oct. 31, 1939 |
| 2,382,504 | Schultz | Aug. 14, 1945 |
| 2,411,971 | MacMillin et al. | Dec. 3, 1946 |